UNITED STATES PATENT OFFICE.

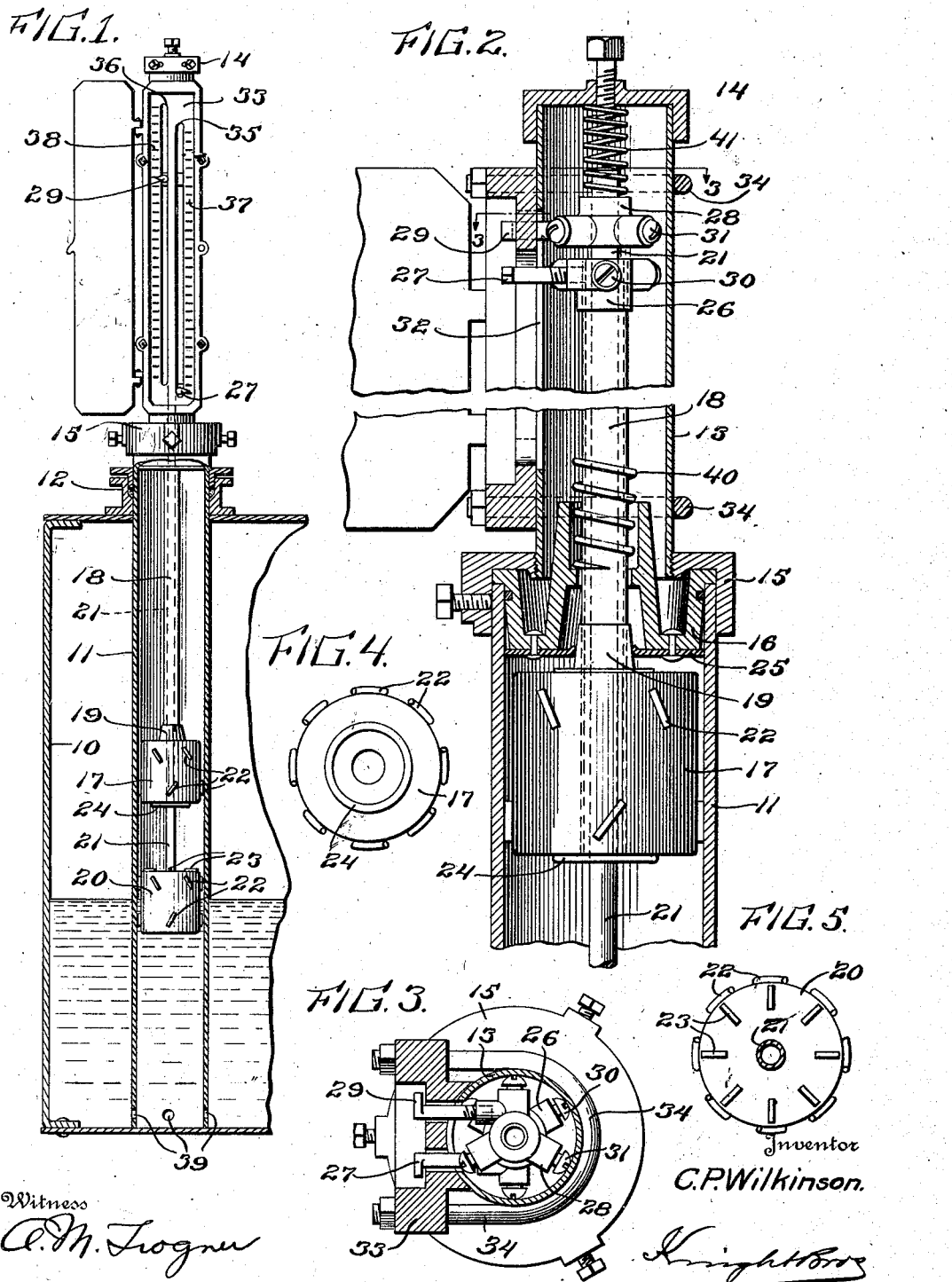

CHARLES PERRY WILKINSON, OF JACKSON, MICHIGAN.

LIQUID-INDICATING GAGE.

1,193,744.     Specification of Letters Patent.     Patented Aug. 8, 1916.

Application filed October 30, 1915. Serial No. 58,845.

*To all whom it may concern:*

Be it known that I, CHARLES P. WILKINSON, a citizen of the United States, residing at Jackson, in the county of Jackson and State of Michigan, have invented certain new and useful Improvements in Liquid-Indicating Gages, of which the following is a specification.

The present invention relates in general to liquid gages, and more particularly to water gages for indicating the height of water in locomotive tenders. Usually there is no means provided whereby the enginemen may know at all times the depth of the water in the tank of the tender without climbing over the coal and measuring through the manhole as on up to date tenders the water tank is generally situated below and to the rear of the coal box, and furthermore, the bottom of the tank is considerably below the foot plate of the engine and the tender. To ascertain the depth of the water, is therefore not only dangerous, but very inconvenient.

Another advantage of my device is that the gage can be read at any time when necessary. This device, however, may be used for other purposes for measuring the depth of fluid of any kind which is contained in the tank.

Another advantage of the present invention is that the gage is self-contained and can be applied in any tank and for any depth required.

Many trunk lines are now equipped with track tanks so that water may be taken while the train is in motion. There is now no way of telling just how much water has been taken, unless it runs over the top of the tank. Now, if my indicator is used, the enginemen know exactly when to stop filling the tank without wasting water or letting it run over. On the other hand, it always causes the enginemen great anxiety when they know that they are running short of water, and this may now be guarded against as the enginemen will at any time know the exact height of the water in the tank.

In the accompanying drawing, one embodiment of the invention has been illustrated, Figure 1 showing an elevation and part section of the gage inserted in the tank; Fig. 2, a vertical section in larger scale of the upper part of the device; Fig. 3, a section on line 3—3 of Fig. 2; Fig. 4, a bottom plan view of the upper float, and Fig. 5, a top plan view of the lower float.

In the tank 10 for water or other fluid, is secured an upright pipe 11 reaching from the bottom of the tank and extending through its top where it is rigidly held in the packing box 12. The upper free end of the pipe 11 is covered by a cap 15 attached by means of screws or other suitable connecting means. This cap supports the outer tubular casing 13 extending upward far enough to be convenient for reading the gage and the upper end of the casing 13 is closed by means of a cap 14.

Beneath the cap 15, and extending downwardly in the pipe 11 is situated a cone shaped guide 16. This has an upper annular flange resting on the end of the pipe so as to be held in position by the cap 15, and is preferably provided with a packing ring. Inside the pipe 11, two floats 17 and 20 are carried, the upper one 17 being provided with a tubular rod 18 extending upward through the guide 16. This tubular rod 18 is of such a length that when the float 17 stands in its uppermost position just beneath the guide 16, the upper end of the rod reaches the top of the scale of the gage which will be described farther on. On the top of the float 17 is secured a conical sleeve 19 seated on the float and tightly inclosing the tubular rod 18, and beneath the cone shaped guide 16 is riveted or secured in any other suitable manner a rubber or leather packing 25 having the same outer diameter as the inner diameter of the pipe 11, and being provided with a central opening of approximately the same diameter as the outer diameter of the tubular rod 18. When the upper float is in the position shown in Fig. 2, the conical sleeve 19 has entered the opening in the packing 25 so as to completely close the upper end of the pipe 11 in order to prevent any water from the tank from slopping out through the upper end of the pipe 11, which otherwise might happen in the event of any surging of the water, this always taking place when the brakes on the train are applied.

The lower float 20 is similar in construction to the upper one, but is suspended on a smaller rod 21, telescoping into the tubular rod 18 and extending through the latter so that the upper end of the scale on the gage registers with the index point on the rod when both floats stand at their highest position as indicated in Fig. 2.

In order to protect the floats from wearing and also to have guides for the floats in the pipe 11, chafing plates 22 are provided on the cylindrical sides of the floats. These plates are preferably made from wire attached to the sides of the floats. It has been found by the use of these chafing plates that the device is much more long lived. They prevent the wearing away of the floats and the pipe, and also prevent all air suction which otherwise might seriously interfere with the easy working and correct indicating of the gage. To protect the ends of the floats, I also provide a ring 24 on the under side of the upper float and a number of radial short pieces 23 on the top of the lower float so that when the two floats are close together there will still be a space between their adjacent ends.

On the upper end of the tubular rod 18 is secured a star-shaped index carrier 26 which is held in position by means of three set screws 30. It is provided with an index 27 which extends through a longitudinal opening 32 in the casing 13. At the upper end of the bar 21 is attached in a similar manner by set screws 31 another star-shaped index carrier 28 provided with an index 29 also extending through the longitudinal opening 32 in the casing 13. The set screws 30 and 31 also serve as guides for the tubular rod 18 and the bar 21 on the rising and sinking of the floats.

In order to read the gage, the scale plate 33, preferably a casting, is secured on the casing 13 by means of a pair of U bolts 34 as best seen in Fig. 3. This scale plate is provided with two longitudinal slots 35 and 36, of which the one 35 is intended for the index 27 and the slot 36 for the lower float index 29. Adjacent to the slots and positioned so as to register with the index points are provided two reading scales 37 and 38. At the lower end of the pipe 11 are provided apertures 39 so that the inside of the pipe communicates with the tank and the surrounding water will always rise at the same height as in the tank.

To prevent any shocks caused by surging of the water a spring 40 is placed around the tubular rod 18 and is made to rest on the bottom of the socket provided in the guide 16, so that whenever the upper float drops down suddenly, or when it is at the end of its downward movement, the upper float will be suspended from the spring 40. Similarly a spring 41 is provided between the cap 14 and the upper end of the bar 21 in order to minimize all shocks in the upward direction of the floats. This, however, will correct itself during steady running of the locomotive.

It will be noted that the surging of the water in the tank will, however, have very slight effect on the water level in the pipe 11. On account of the sudden stopping of the train when the water in the tank is thrown in one direction, the small holes 39 will not permit of any sudden increase or decrease in the quantity of the water inside the pipe 11, so that beyond a slight shaking of the index point no great difference will be shown in the gage. The two scales 37 and 38 are continuous, that is, the scale 38 commences with the lowest denomination at the bottom indicating at the top approximately half the depth of the tank and the scale 37 continues from there with its lowest reading at the bottom and the highest at the top. Supposing the tank takes six feet of water, the scale 38 would then be graduated from zero up to about three feet, and the scale 37 from three feet to six feet.

It is evident that if the tanks are exceptionally deep, instead of only two floats, three or more might be used, which are all telescopic and working continuously. In the case of very shallow tanks again, one float might be sufficient.

When the tank is entirely filled, the two indexes 27, 29 stand as shown in Fig. 2, that is, with the upper float at the top of pipe 11 and the lower float about midway down in the tank, or in other words, at a distance below the upper float, corresponding to the length of permissible travel of the upper float. As soon as the water level begins to descend, the upper float falls until the index 27 is at the bottom of scale 37 and the index carrier 26 impinges against spring 40 which will then stop further progress of the upper float. As soon as the latter has arrived in this position, the lower float with its index 29, begins its downward travel which it continues until it reaches the lower end of the pipe 11 and the tank is empty.

I claim:—

1. A gage for liquids comprising a tube inserted in a vertical position in the liquid and provided with apertures at its lower end, a plurality of floats in the tube being guided therein so as to permit free air passage between the bodies of the floats and the tube, a rod attached to each one of said floats and extending in one direction therefrom through the tube parallel to its axis, a guide box at that end of the tube for the rods, a pointer on the end of each rod and scales being provided on said guide box on which said pointers are adapted to indicate the position of the floats.

2. A gage for liquids, comprising a tube inserted in a vertical position in the liquid and provided with apertures at its lower end, a float in the tube being guided therein so as to permit free air passage between the body of the float and the tube, a rod centrally attached to the one end of the float and extending axially through the upper end of said tube, a guide box at the upper end of the tube for the rod, a conical sleeve on said rod and flexible packing in the guide box having a central opening, said conical sleeve constructed to completely fill said opening so as to seal it when the float is in its uppermost position in the tube, and means on said rod and said guide box for indicating the relative position of the float and the tube.

3. A gage for liquids, comprising a tube inserted in a vertical position in the liquid and provided with apertures at its lower end, a plurality of floats inserted in said tube one above the other, each of said floats having an axially positioned rod extending upward through the upper end of said tube, said rods being constructed to telescope with each other, the rod for the lowermost float extending beyond the upper end of the rod of the float next in order, each rod being provided with a pointer at its upper free end and a scale for each of said pointers being provided on said guide boxes.

4. A gage for liquids, comprising a tube inserted in a vertical position in the liquid and provided with apertures at its lower end, a plurality of floats inserted in said tube one above the other, each of said floats having an axially positioned rod extending upward through the upper end of said tube, said rods being constructed to telescope with each other, the rod for the lowermost float extending beyond the upper end of the rod of the float next in order, each rod being provided with a pointer at its upper free end and a scale for each of said pointers being provided on said guide box, said scales being graduated to form continuous reading from zero upward commencing with the scale for the pointer of the lowermost float.

5. A gage for liquids, comprising a tube inserted in a vertical position in the liquid and provided with apertures at its lower end, a plurality of floats inserted in said tube one above the other, each of said floats having an axially positioned rod extending upward through the upper end of said tube, said rods being constructed to telescope with each other, the rod for a lower float extending beyond the upper end of the rod of the float next above it, each rod being provided with a pointer at its upper free end and a scale for each of said pointers being provided on said guide box, a cushioning device in said guide box and an abutment on the rod of the uppermost float for coöperating with said cushioning device when the uppermost float is in its lowest position.

6. A gage for liquids, comprising a tube inserted in a vertical position in the liquid and provided with apertures at its lower end, a plurality of floats in said tube one above the other, each of said floats having an axially positioned rod extending upward through the upper end of said tube, said rods being constructed to telescope with each other, the rod for a lower float extending beyond the upper end of the rod of the float next above it, said guide box having a cylindrical shell placed coaxially with and above said tube, radial members on each of the rods contacting with said shell for guiding the rods, each rod having a pointer and said shell being provided with a scale for each of the pointers.

7. A gage for liquids, comprising a tube inserted in a vertical position in the liquid and provided with apertures at its lower end, a plurality of floats inserted in said tube one above the other, each of said floats having an axially positioned rod extending upward through the upper end of said tube, said rods being constructed to telescope with each other, the rod for a lower float extending beyond the upper end of the rod of the float next above it, said guide box having a cylindrical shell placed coaxially with and above said tube, radial members on each of the rods contacting with said shell for guiding the rods, each rod having a pointer and said shell being provided with a scale for each of the pointers, a cushioning device at the upper end of said shell and an abutment on the rod of the lowermost float for coöperating with said cushioning device.

8. A gage for liquids, comprising a tube inserted in a vertical position in the liquid and provided with apertures at its lower end, a plurality of floats inserted in said tube one above the other, a plurality of guiding projections on each float permitting free air passage between the body of the float and the tube, and ridges on the adjacent faces of the floats permitting an air passage between them, each of said floats having an axially positioned rod extending upward through the upper end of said tube, said rods being constructed to telescope with each other, the rod for the lowermost float extending beyond the upper end of the rod of the float next in order, each rod being provided with a pointer at its upper free end and a scale for each of said pointers being provided on said guide box.

9. A gage for liquids, comprising a tube inserted in a vertical position in the liquid and provided with apertures at its lower end, a plurality of floats inserted in said tube one above the other, a plurality of guiding projections on each float permitting free air passage between the body of the float and the tube, and ridges on the adjacent faces of the floats permitting an air passage between them, the ridges on one of said faces being annular and on the opposite face radial, each of said floats having an axially positioned rod extending upward through the upper end of said tube, said rods being constructed to telescope with each other, the rod for the lowermost float extending beyond the upper end of the rod of the float next in order, each rod being provided with a pointer at its upper free end and a scale for each of said pointers being provided on said guide box.

10. A water gage for a tank comprising a vertical tube standing on the bottom of the tank and reaching above its top, and provided with apertures at its lower end, a pair of floats in said tube, a tubular rod on the upper one of said floats extending in axial direction beyond the top of said tube, a guiding shell extending axially upward from said tube and a collar with radial projections on said tubular rod engaging with said shell to guide said tubular rod, an abutment in said shell beneath said collar providing a stop on the downward movement of said upper float, said tubular rod being of such a length that the lowermost position of the upper float will be approximately half way between the top and bottom of the tank, a central rod on said lower float constructed to telescope with said tubular rod and extend beyond the upper end thereof and having such a length that the lower float reaches the bottom of the tank when the tank is empty, a collar on the free end of said central rod having radial projections engaging with said shell to guide said central rod, means on said rods and said shell indicating the position of each float in said tube.

The foregoing specification signed at Jackson, Michigan, this 9th day of October 1915.

CHARLES PERRY WILKINSON.

Copies of this patent may be obtained for five cents each, by addressing the "Commissioner of Patents, Washington, D. C."